United States Patent Office 2,938,834
Patented May 31, 1960

2,938,834

PROCESS FOR THE OXIDATION OF PREGNENES

Joseph J. Goodman, Nanuet, N.Y., assignor to American Cyanamid Company, New York, N.Y., a corporation of Maine No Drawing. Filed Mar. 30, 1959, Ser. No. 802,642

11 Claims. (Cl. 195—51)

This invention relates to a method for the biological oxidation of steroids. More particularly, it relates to a fermentative method for the conversion of 20-dihydro steroids of the pregnane series to the corresponding 20-keto steroids.

The process of the present invention can be illustrated by the following structural formulae

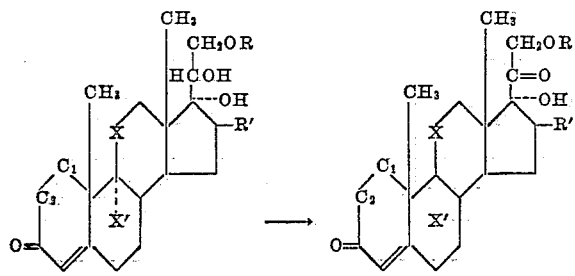

in which R is hydrogen or a lower alkanoyl radical, R' is hydrogen, hydroxyl or a lower alkanoyloxy radical, X is a

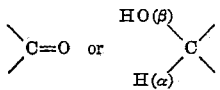

radical, X' is a halogen atom and —C$_1$—C$_2$— is a —CH$_2$—CH$_2$— or —CH=CH— group.

The starting material used in the process of the present invention can be for example 9α-fluoro-11β,17α,20β,21-tetrahydroxy-4-pregnen-3-one,
9α-fluoro-11β,16α,17α,20β,21 - pentahydroxy - 4-pregnen-3-one,
9α-fluoro-11β,16α,17α,20β,21 - pentahydroxy - 1,4-pregnadien-3-one,
9α-fluoro-16α,17α,20β,21-tetrahydroxy - 4 - pregnene - 3,11-dione,
9α-fluoro-16α,17α,20β,21 - tetrahydroxy - 1,4-pregnadiene-3,11-dione,
9α-bromo-11β,16α,17α,20β,21-pentahydroxy - 4 - pregnen-3-one,
9α-bromo-11β,16α,17α,20β,21-pentahydroxy - 1,4 - pregnadien-3-one,
16α,21-diacetoxy-9α-fluoro-11β,17α,20β - trihydroxy - 4-pregnen-3-one.

and the like. The general preparation of these compounds is described and claimed in copending application Serial No. 802,661, filed March 30, 1959.

The process of the present invention is carried out by growing a microorganism such as Bacterium cyclo-oxidans (ATCC 12,673), Corynebacterium simplex (ATCC 6946) or Mycobacterium rhodochrous (J. Am. Chem. Soc. 79, 4818, 1957) in suitable growth media which essentially consists of a source of nitrogenous factors and an assimilable source of carbon and energy. The detail description of media, fermentation conditions, etc. for these organisms has been described in the chemical literature and patent literature such as U.S. Patent No. 2,822,318. The steroid compound dissolved or suspended in a water miscible solvent non-toxic towards the organism, is added to the cultivated microorganism. The fermentation is allowed to proceed under aerobic conditions for several days. Maximum conversion to the 20-keto steroid usually takes place within about 7 to 9 days although in some instances a longer period of time will produce more of the desired steroid. The fermentation can be carried out at a temperature of from about 20° C. to 40° C. although the preferred range is between 25° C. and 37° C.

Following completion of the fermentation the products are subjected to polarographic and blue tetrazolium assays which indicate the total steroid present and the amount of 20-keto steroid present. In those instances when the starting steroid has a single bond in the 1,2-positions this is converted into a double bond with the conversion to the 20-keto steroid.

The products produced by the present process such as triamcinolone (9α-fluoro-11β,16α,17α,21-tetrahydroxy-1,4-pregnadiene-3,20-dione) are well known for their high glucocorticoid activity. This activity is useful in the treatment of rheumatic diseases, arthritis, burns, bursitis, etc.

The following examples illustrate in greater detail the process of the present invention.

Example 1

Bacterium cyclo-oxidans (ATCC 12,673) is grown in 50 ml. portions of medium in two 250 ml. Erlenmeyer flasks, on a rotary shaker operating at 185 revolutions per minute, at 26.5° C. The medium consisted of commercial dextrose (Cerelose) 2 gram, yeast extract 2 gram, potassium dihydrogen phosphate 2 gram and water to make 2000 milliliters. After a preliminary growth period of 24 hours, a 500 mcg./ml. quantity 9α-fluoro-11β,16α,17α,20β,21-pentahydroxy-4-pregnen-3-one contained in 0.5 ml. of dimethylformamide is added to each of the flasks. The culture in one flask is further aerated for 9 days. The following results were obtained.

| Conversion Time (Days) | Polarographic Total, mcg./ml. | Assay, Δ¹ Percent | 20-keto Steroids, B.T. Assay, mcg./ml. | Paper Chromatography Showed |
|---|---|---|---|---|
| 1 | 400 | 47 | 7 | (1) 9α-fluoro-11β,16α,17α,20β, 21 - pentahydroxy - 4 - pregnen-3-one and (2) 9α-fluoro-11β,16α,17α,20β,21-pentahydroxy-1,4-pregnadien-3-one. |
| 9 | 395 | 88 | 86 | (1) 9α-fluoro-11β,16α,17α,20β, 21-pentahydroxy-1,4-pregnadien - 3 - one and (2) 9α-fluoro-11β,16α,17α,21-tetrahydroxy-1,4-pregnadien-3-one. |

The percent of Δ¹ increases and the amount of 20-keto steroids increases from 7 out of about 400 mcg./ml. to 86 out of about 400 mcg./ml. and that there is the appearance of a 20-keto steroid on the chromatograms.

A further experiment was made, similar to that shown above, in which the triamcinolone was isolated and proved to be triamcinolone both by paper chromatography and by infra-red analysis.

Example 2

An experiment was carried out similar to that shown in Example 1 using 9α-fluoro-11β,16α,17α,20β,21-pentahydroxy-4-pregnen-3-one and 9α-fluoro-11β,16α,17α,20β,21-pentahydroxy-1,4-pregnen-3-one as substrates; with samples being taken for assay at conversion times of 1, 9, and 14 days. The results are shown below:

| Substrate | Conversion Time (Days) | Polarographic Total, mcg./ml. | Assay, Δ¹ Percent | 20-keto Steroids, B.T. Assay, mcg./ml. | Paper Chromatography Showed |
|---|---|---|---|---|---|
| 9α-fluoro-11β,16α,17α,20β,21-pentahydroxy-4-pregnen-3-one. | 1 | 312 | 88 | 11 | 9α-fluoro-11β,16α,17α,20β,21-pentahydroxy-1,4-pregnadien-3-one. |
| | 9 | 407 | 93 | 107 | 9α-fluoro-11β,16α,17α,20β,21-pentahydroxy-1,4-pregnadien-3-one and 9α-fluoro-11β,16α,17α,21-tetrahydroxy-1,4-pregnadien-3-,20-dione. |
| | 14 | 409 | 96 | 105 | 9α-fluoro-11β,16α,17α,20β,21-pentahydroxy-1,4-pregnadien-3-one and 9α-fluoro-11β,16α,17α,21-tetrahydroxy-1,4-pregnadiene-3,20-dione. |
| 9α-fluoro-11β,16α,17α,20β,21-pentahydroxy-1,4-pregnadien-3-one. | 1 | 327 | 91 | 10 | 9α-fluoro-11β,16α,17α,20β,21-pentahydroxy-1,4-pregnadien-3-one. |
| | 9 | 436 | 96 | 111 | 9α-fluoro-11β,16α,17α,20β,21-pentahydroxy-1,4-pregnadien-3-one and 9α-fluoro-11β,16α,17α,21-tetrahydroxy-1,4-pregnadiene-3,20-dione. |
| | 14 | 429 | 98 | 124 | 9α-fluoro-11β,16α,17α,20β,21-pentahydroxy-1,4-pregnadien-3-one and 9α-fluoro-11β,16α17α,21-tetrahydroxy-1,4-pregnadiene-3,20-dione. |

This experiment illustrates the gradual increase of the B.T. Assay with time; indicating the formation of a 20-keto steroid which is shown on paper chromatograms to be 9α-fluoro-11β,16α,17α,21-tetrahydroxy-1,4-pregnadiene-3,20-dione under aerated conditions. The increase of B.T. Assay from around 10 to 100–125 mcg./ml. when using 9α-fluoro-11β,16α,17α,20β,21-pentahydroxy-1,4-pregnadien-3-one, shows about a 25% yield.

*Example 3*

This experiment is carried out to show the effect of a richer medium on the conversion of a 20-dihydro to a 20-keto compound. *Bacterium cyclo-oxidans* (ATCC 12,673) is used in the following medium

| | Grams |
|---|---|
| Commercial dextrose (Cerelose) | 20 |
| Yeast extract | 5 |
| Peptone | 5 |
| Tryptone | 5 |
| Calcium carbonate | 2.5 |
| Water to 1000 milliliters. | |

Using the conditions of fermentation described in Example 1 and 9α-fluoro-11β,16α,17α,20β,21-pentahydroxy-4-pregnen-3-one as substrate and allowing the flasks to aerate for various lengths of time on the shaker the following results are obtained.

| Conversion Time (Days) | Polarographic Total, mcg./ml. | Assay, Δ¹ Percent | 20-Keto Steroids, B.T. Assay, mcg./ml. | Paper Chromatography shows |
|---|---|---|---|---|
| ½ | 403 | 37 | 16 | A, B |
| 4 | 417 | 92 | 109 | B, C |
| 7 | 459 | 92 | 138 | B, C |
| 11 | 476 | 94 | 135 | B, C |

Code:
A = 9α-fluoro-11β,16α,17α,20β,21-pentahydroxy-4-pregnen-3-one.
B = 9α-fluoro-11β,16α,17α,20β,21-pentahydroxy-1,4-pregnadien-3-one.
C = 9α-fluoro-11β,16α,17α,21-tetrahydroxy-1,4-pregnadiene-3,20-dione.

The increase in time of fermentation up to 7 days shows an increase in 20-keto steroids.

*Example 4*

*Corynebacterium simplex* (ATCC 6946) was grown in 50 ml. portions of medium in two 250 ml. Erlenmeyer flasks at 26.5° C. on a rotary shaker operating at 185 revolutions per minute. The medium consisted of

| | Grams |
|---|---|
| Commercial dextrose (Cerelose) | 2 |
| Yeast extract | 2 |
| KH$_2$PO$_4$ | 2 |
| Water to 2000 milliliters. | |

After a preliminary growth period of 25 hours, a 250 mcg./ml. quantity of 9α-fluoro-11β,16α,17α,20β,21-pentahydroxy-1,4-pregnadien-3-one contained in 0.5 ml. of dimethylformamide was added to each of the flasks. The culture in one flask was further aerated for 9 days; that in the other flask was further aerated for 14 days. The following results were obtained.

| Conversion Time (Days) | Polarographic Total, mcg./ml. | Assay, Δ¹ Percent | 20-Keto Steroids, B.T. Assay, mcg./ml. | Paper Chromatography Showed |
|---|---|---|---|---|
| 0 | 245 | 95 | 10–15 | B. |
| 9 | 234 | 93 | 61 | Strong C, B. |
| 14 | 261 | 94 | 74 | Very Strong C, B. |

Code:
B = 9α-fluoro-11β,16α,17α,20β,21-pentahydroxy-1,4-pregnadien-3-one.
C = 9α-fluoro-11β,16α,17α,21-tetrahydroxy-1,4-pregnadiene-3,20-dione.

*Example 5*

In this experiment *Mycobacterium rhodochrous* (SC 2318) is tested for conversion of 9α-fluoro-11β,16α,17α,20β,21-pentahydroxy-1,4-pregnadien-3-one and 9α-fluoro-11β,17α,20β,21-tetrahydroxy-1,4-pregnadien-3-one to the 20-keto steroids. The medium employed is that described in Example 3. The substrate load is 500 mcg./ml. Other fermentation conditions are as described in Example 1. The following results are obtained.

| Substrate (500 mcg./ml.) | Conversion Time (Days) | Polarographic Total, mcg./ml. | Assay, Δ¹ Percent | 20-Keto Steroids, B.T. Assay, mcg./ml. | Paper Chromatography Showed |
|---|---|---|---|---|---|
| B | 5 | 330 | 100 | 92 | B and C. |
| | 9 | 370 | 100 | 133 | B and C. |
| | 15 | 417 | 100 | 141 | B and C. |
| E | ½ | 445 | 100 | 14 | E. |
| | 5 | 442 | 100 | 54 | E and F. |
| | 9 | 467 | 100 | 70 | E and F. |
| | 15 | 467 | 100 | 69 | E and F. |

Code:
B = 9α-fluoro-11β,16α,17α,20β,21-pentahydroxy-1,4-pregnadien-3-one.
C = 9α-fluoro-11β,16α,17α,21-tetrahydroxy-1,4-pregnadiene-3,20-dione.
E = 9α-fluoro-11β,17α,20β,21-tetrahydroxy-1,4-pregnadien-3-one.
F = 9α-fluoro-11β,17α,21-trihydroxy-1,4-pregnadiene-3,20-dione.

I claim:
1. A method of oxidizing a 20-dihydro steroid of the pregnane series to the corresponding 20-keto steroid of the pregnane series which comprises exposing the said 20-dihydro steroid to the oxidative-fermentative action of microorganisms of the group consisting of *Bacterium cyclo-oxidans*, *Corynebacterium simplex* and *Mycobacterium rhodochrous* and recovering said 20-keto steroid therefrom.

2. A method of oxidizing a 20-dihydro steroid having the general formula:

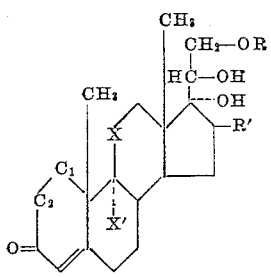

in which R is a member of the group consisting of hydrogen and lower alkanoyl radicals, R' is a member of the group consisting of hydrogen, hydroxyl and lower alkanoyloxy radicals, X is a member of the group consisting of

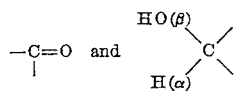

radicals, X' is a halogen atom and —$C_1$—$C_2$— is a member of the group consisting of —$CH_2$—$CH_2$— and —CH=CH— groups which comprises contacting said 20-dihydro steroid with the oxidative-fermentative action of microorganisms of the group consisting of *Bacterium cyclo-oxidans*, *Corynebacterium simplex* and *Mycobacterium rhodochrous* and recovering the corresponding 20-keto steroid therefrom.

3. A method of preparing 9α-fluoro-11β,16α,17α,21-tetrahydroxy-1,4-pregnadiene-3,20-dione which comprises contacting 9α-fluoro-11β,16α,17α,20β,21-pentahydroxy-4-pregnen-3-one with a growth medium containing *Bacterium cyclo-oxidans* and recovering said compound therefrom.

4. A method of preparing 9α-fluoro-11β,16α,17α,21-tetrahydroxy-1,4-pregnadiene-3,20-dione which comprises contacting 9α-fluoro-11β,16α,17α,20β,21-pentahydroxy-1,4-pregnadien-3-one with a growth media containing *Bacterium cyclo-oxidans* and recovering the said product therefrom.

5. A method of preparing 9α-fluoro-11β,17α,21-trihydroxy-1,4-pregnadiene-3,20-dione which comprises contacting 9α-fluoro-11β,17α,20β,21-tetrahydroxy-1,4-pregnadien-3-one with a growth media containing *Bacterium cyclo-oxidans* and recovering said product therefrom.

6. A method of preparing 9α-fluoro-11β,16α,17α,21-tetrahydroxy-1,4-pregnadiene-3,20-dione which comprises contacting 9α-fluoro-11β,16α,17α,20β,21-pentahydroxy-1,4-pregnadien-3-one with a growth media containing *Corynebacterium simplex* and recovering said product therefrom.

7. A method of preparing 9α-fluoro-11β,16α,17α,21-tetrahydroxy-1,4-pregnene-3,20-dione which comprises contacting 9α-fluoro-11β,16α,17α,20β,21-pentahydroxy-4-pregnen-3-one with a growth media containing *Corynebacterium simplex* and recovering said product therefrom.

8. A method of preparing 9α-fluoro-11β,17α,21-trihydroxy-1,4-pregnadiene-3,20-dione which comprises contacting 9α-fluoro-11β,17α,20β,21-tetrahydroxy-1,4-pregnadien-3-one with a growth media containing *Corynebacterium simplex* and recovering said product therefrom.

9. A method of preparing 9α-fluoro-11β,16α,17α,21-tetrahydroxy-1,4-pregnadiene-3,20-dione which comprises contacting 9α-fluoro-11β,16α,17α,20β,21-pentahydroxy-1,4-pregnadien-3-one with a growth media containing *Mycobacterium rhodochrous* and recovering said product therefrom.

10. A method of preparing 9α-fluoro-11β,17α,21-trihydroxy-1,4-pregnadiene-3,20-dione which comprises contacting 9α-fluoro-11β,17α,20β,21-tetrahydroxy-1,4-pregnadien-3-one with a growth media containing *Mycobacterium rhodochrous* and recovering said product therefrom.

11. A method of preparing 9α-fluoro-11β,16α,17α,21-tetrahydroxy-1,4-pregnene-3,20-dione which comprises contacting 9α-fluoro-11β,16α,17α,20β,21 - pentahydroxy-4-pregnen-3-one with a growth media containing *Mycobacterium rhodochrous* and recovering said product therefrom.

No references cited.